United States Patent Office 3,828,101
Patented Aug. 6, 1974

3,828,101
METHOD OF PREPARATION OF FERRITE CATALYSTS
Edward J. Miklas, Houston, Tex., assignor to Petro-Tex Chemical Corporation, Houston, Tex.
No Drawing. Filed Aug. 26, 1971, Ser. No. 175,381
Int. Cl. C01g 49/00
U.S. Cl. 423—594          11 Claims

ABSTRACT OF THE DISCLOSURE

Improved catalysts for dehydrogenation can be prepared by coprecipitating the metal containing catalysts from a solution of metal ions in the presence of a low molecular weight polyhydric material such as pentaerythritol. The result of having the polyhydric material present is that the precipitate has the form of a gelatinous precipitate of improved processability. The catalyst itself is more active in dehydrogenations and physically stronger than comparable catalyst prepared by conventional methods.

BACKGROUND OF THE INVENTION

This invention relates to improved dehydrogenation catalyst, their method of preparation, particularly catalysts for oxidative dehydrogenations and the method of using such catalyst.

The types of dehydrogenation catalysts known are quite varied. The present invention is concerned with those dehydrogenation catalysts which comprise a metal compound or mixture of metal compounds. Such compounds include the metal oxides, metal salts such as the halides, phosphates, sulfates, molybdates, tungstates, and the like. Generally, these catalysts can be characterized as compounds containing a metal having a polyoxidation state, i.e., a metal having at least two oxidation states, in addition to the zero state. Suitable metals are found in Groups IVB, VB, VIB, VIIB, VIII, IB, IVA, VA and VIA of the Periodic Table [1] of elements. Particularly useful polyoxidation state metals are Ti, V, Cr, Mn, Fe, Co, Ni, Cu, Nb, Mo, Ru, Rh, Pd, Sn, Sb, W, Re, Os, Ir, Pt, Au, Hg, Tl, Pb, Bi, and Po. It has been found that instant process is particularly suitable for the preparation of oxidative dehydrogenation catalyst. Some excellent oxidative dehydrogenation catalysts include stannic phosphate, lead molybdate, aluminum tungstate, cobalt tungstate, iron oxide, antimony oxide, bismuth molybdate, chromium oxide, tungsten oxide, vanadium oxide and the like. Suitable oxidative dehydrogenation catalysts can contain one such polyoxidation state metal or a mixture of such metal compounds. Very often these catalysts will be employed in various combinations with each other as for example lead molybdate/aluminum tungstate, lead molybdate/cobalt tungstate, iron oxide/chromium oxide, iron oxide/vanadium oxide, iron oxide/manganese oxide, etc.

In addition to the polyoxidative state metal, the dehydrogenation catalysts of the present invention can also contain one or more mono-oxidation state metals which act as promoters, initiators, stabilizers and the like. The single oxidation state metal or metal compounds include metals from Groups IA, IIA, IIIB, IVB, VB, VIIB, IB, IIB, IIIA and IVA, preferably the divalent metals in these Groups. Specifically among those that are often found in oxidative dehydrogenation catalytic systems are Mg, Al, Ca, Sc, Zn, Sr, Cd and Ba. Aluminum oxide in the form of natural or synthetic molecular sieves has been found to be an effective oxidative dehydrogenation catalyst as shown in U.S. Pats. 3,173,855 and 3,247,278.

[1] Handbook of Chemistry and Physics, 45th ed., 1964–65, The Chemical Rubber Co., Cleveland, Ohio, p. B–2.

Also found in the oxidative dehydrogenation catalysts are compounds of Be, the lanthanides, La, Hf, Ta, Ce, Pr, Nd, Pm, Sm, Eu, Gd, Tb, Dy, Ho, Er, Tm, Yb, Lu, Di (used to describe a mixture of rare earths, e.g. a $Di_2O_3$ is typically 45 to 46 percent $La_2O_3$, 1 to 2 percent $CeO_2$, 9 to 10 percent $Pr_6O_{11}$, 32 to 33 percent $Nd_2O_3$, 5 to 6 percent $Sm_2O_3$, 3 to 4 percent $Gd_2O_3$, 0.4 percent $Yb_2O_3$ and 1 to 2 percent other rare earths), the actinides (e.g. Th, Pa), Ge, Ga, Y, Zn, Se, Te, and In.

In addition to the metals the catalysts often contain various non-metallic components which also serve as promoters, initiators, stabilizers or the like. Alkali metal compounds are frequently present in the oxidative dehydrogenation catalyst in limited quantities such as $Li_2O$, $Na_2O$ and $K_2O$. Other additives are sulfur, phosphorus, silicon, boron or mixtures thereof, for example, sulfates, sulfites, sulfides, alkylmercaptans, sulfuric acid, phosphates, phosphoric acid, silica, silicates, boron trifluoride and the like. Such additives are disclosed in U.S. Pats. 3,247,278; 3,270,080; 3,303,238; 3,324,195; 3,398,100.

Halogen is also often present in oxidative dehydrogenation catalyst to improve the results. The presence of halogen in the dehydrogenation zone is particularly effective when the compound to be dehydrogenated is saturated, such as a saturated hydrocarbon. The halogen present in the dehydrogenation zone may be either elemental halogen or any compound of halogen which would liberate halogen under the conditions of reaction. Suitable sources are such as hydrogen iodide, hydrogen bromide and hydrogen chloride, ethyl iodide, methyl bromide, methyl chloride, 1,2-dibromoethane, ammonium iodide, ammonium bromide, ammonium chloride, sulfuryl chloride, etc. The halogen may be liberated partially or entirely by a solid source as shown in U.S. Pat. 3,130,241. Mixtures of halogens and halogen sources can be used. The amount of halogen, calculated as elemental halogen, may be as little as about 0.0001 or less mole of halogen per mole of organic compound to be dehydrogenated to as high as 0.2 or 0.5. The use of halogens in oxidative dehydrogenations is shown in U.S. Pats. 3,210,436; 3,207,805–3,207,810; 3,277,207; 3,278,626; 3,308,182–3,308,200; 3,316,320; 3,356,750; 3,359,343; 3,374,283; 3,382,290; 3,440,298; 3,442,968.

In addition to the catalysts described above the following U.S. patents further described oxidative dehydrogenation catalysts generally contemplated by the instant invention: U.S. Pats. 3,420,911; 3,420,912; 3,428,703; 3,440,299; 3,260,767; 3,274,285; 3,284,536; 3,303,234–7; 3,320,329; 3,334,152; 3,336,408; 3,342,890; 3,404,193; 3,437,703, 3,446,869; 3,456,030.

Among the preferred catalysts of this invention are those which contain iron, oxygen and at least one other metallic element Me. The catalysts comprise crystalline compositions of iron, oxygen, and at least one other metallic element Me. The catalysts comprise ferrites. Ordinarily, the ionic radius of the second metallic ingredient(s) Me is small enough that the oxygen anions are not spread too far apart. That is, the elements must be able to form a crystalline structure with the iron and oxygen.

A preferred type of catalyst of this type is that having a face-centered cubic form of crystalline structure. Examples of this type of catalyst are ferrites of the general formula $MeO \cdot Fe_2O_3$ where Me is a divalent metal cation such as $Mg^{++}$ or $Ni^{++}$. However, if the cations are large, such as $Sr^{++}$ (1.35 A.), the spinel structure may not occur and other types of ferrites having a hexagonal crystal of the type $SrO \cdot 6Fe_2O_3$ may be formed. These hexagonal ferrites are within the scope of the definition of catalysts of this invention.

Suitable catalysts may also be ferrites wherein other metals are partially substituted for the iron. For example, atoms having a valance of +3 may be partially substituted for some of the $Fe^{+++}$ atoms. Also, metal atoms having a valence of +4 may replace some of the $Fe^{+++}$ ions. However, the catalysts will still suitably have iron present in an amount described above in relation to the total atoms of the second metallic ingredient(s).

The catalysts may have the iron combined in crystalline structure with oxygen and more than one other metalic element, as mentioned above. For example, a preferred type of ferrite is that essentially or approximately of the formula, $MeFe_2O_4$, where Me represents a divalent metal ion with an ionic radius approximately between 0.5 and 1.1 A., preferably between about 0.6 and 1.0 A. In the case of simple ferrites, Me may be, e.g., one of the divalent ions of the transition elements as Mg, Ca, Sr, Ba, Cr, Mn, Co, Ni, Zn, or Cd. However, a combination of these ions is also possible to form a ferrite such as $Ni_{0.5}Mg_{0.5}Fe_2O_4$ or $Ni_{0.25}Mg_{0.75}Fe_2O_4$. Moreover, the symbol Me may represent a combination of ions which have an average valency of two. However, it is essential that the crystalline structure contain iron and the metallic element other than iron.

Examples of catalysts are such as magnesium ferrite, cobalt ferrite, nickel ferrite, zinc ferrite, barium ferrite, strontium ferrite, manganese ferrite, calcium ferrite, cadmium ferrite, silver ferrite, zirconium ferrite, and earth ferrites such as cerium ferrite or mixtures of ferrites, such as ferrites containing iron combined with at least one element selected from the group consisting of Mg, Zn, Ni, Co, Mn, Cu, Cd, Ca, Ba, Sr, Al, Cr, Ti, V, Mo, W, Na, Li, K, Sn, Pb, Sb, Bi, Ga, Ce, La, Th, Pr, Nd, Pm, Sm, Eu, Gd, Tb, Dy, Ho, Er, Tm, Yb, Lu and mixtures thereof, with a preferred group being Mg, Ca, Sr, Ba, Mn, Cr, Co, Ni, Zn, Cd, and mixtures thereof, and particularly preferred metals being Mg or Mn. Examples of mixed ferrites are magnesium ferrite plus zinc ferrite, magnesium ferrite plus nickel ferrite, magnesium ferrite plus cobalt ferrite, magnesium ferrite plus nickel ferrite plus zinc ferrite, magnesium ferrite plus manganese ferrite. As explained above, these ferrites may be physical mixtures of the ferrites or may contain crystals wherein the different metallic atoms are contained in the same crystal; or a combination of physical mixtures and chemical combinations. Some examples of a chemical combination would be magnesium zinc ferrite, magnesium chromium ferrite, zinc chromium ferrite and lanthanum chromium ferrite.

The valency of the metals in the catalysts do not have to be any particular values, although certain combinations are preferred or disclosed elsewhere. The determination of the valency of the ions is sometimes difficult and the results are uncertain. The different ions may exist in more than one valency state. However, a preferred catalyst is one which has the iron predominately in the $Fe^{+++}$ state. Some ferrites are described in Ferromagnetism, by Richard M. Bozorth (D. Van Nostrand Co., Inc., 1951), which disclosure is hereby incorporated by reference.

Although the ferrite catalysts may be broadly defined as containing crystalline structures of iron, oxygen and the second metallic ingredient(s), certain types of catalysts are preferred. Valuable catalysts were produced comprising as the main active constituent in the catalyst surface exposed to the reaction gases, iron, oxygen and at least one element selected from the group of Mn, or Periodic Table Group IIA, IIB or VIII such as those selected from the group consisting of magnesium, manganese, calcium, cadmium, cobalt, zinc, nickel, barium, strontium, and mixtures thereof. Preferred catalysts have iron present as the predominant metal in the catalyst exposed in the reaction gases.

A preferred class of catalysts containing two second metallic ingredients are those of the basic formula $Me_aCr_bFe_cO_4$ where $a$ can vary within the range of about about 0.1 to about 3, $b$ can vary from greater than 0 to less than 2 and $c$ can vary from greater than 0 to less than 3. Me can be any of the metallic ingredients, other than chromium, previously described, particularly Periodic Table Groups IIA, IIB, III and VIII. In particular, the metals from these groups that are desirable are Mg, Ba, La, Ni, Zn and Cd. The preferred compositions exhibit a certain type of X-ray diffraction pattern. The preferred compositions do not have any sharp X-ray diffraction reflection peaks as would be found, e.g., in a highly crystalline material having the same chemical composition. Instead, the ferrite composition of this invention exhibit reflection peaks which are relatively broad. The degree of sharpness of the reflection peak may be measured by the reflection peak band width at half height ($Wh/2$). In other words, the width of the reflection peak as measured at one-half of the distance to the top of the peak is the "band width at half height." The band width at half height is measured in units of ° 2 theta. Techniques for measuring the band widths are discussed, e.g., in chapter 9 of Klug and Alexander, X-Ray Diffraction Producers, John Wiley and Son, New York, 1954. The observed band widths at half height of the preferred compositions of this invention are at least 0.16 ° 2 theta and normally will be at least 0.20 ° 2 theta.[2] For instance, excellent compositions have been made with band widths at half height of at least 0.22 or 0.23 °2 theta. The particular reflection peak used to measure the band width at one-half height is the reflection peak having Miller ($hkl$) indices of 220. See, e.g., chapter of Klug and Alexander, ibid. Applicants do not wish to be limited to any theory of the invention in regard to the relationship between composition activity and band width.

Suitable preferred ferrites according to this invention are zinc ferrites having X-ray diffraction peaks within the $d$-spacings 4.83 to 4.89, 2.95 to 3.01, 2.51 to 2.57, 2.40 to 2.46, 2.08 to 2.14, 1.69 to 1.75, 1.59 to 1.65 and 1.46 to 1.52, with the most intense peak being between 2.95 to 3.01; manganese ferrite having peaks at $d$ spacings within or about 4.87 to 4.93, 2.97 to 3.03, 2.50 to 2.58, 2.09 to 2.15, 1.70 to 1.76, 1.61 to 1.67, and 1.47 to 1.53 (with other peaks) with the most intense peak being between 2.52 to 2.58; magnesium ferrites having peaks between 4.80 to 4.86, 2.93 to 2.99, 2.49 to 2.55, 2.06 to 2.12, 1.68 to 1.73, 1.58 to 1.63 and 1.45 to 1.50 with the most intense peak being between 2.49 and 2.55; and nickel ferrites having peaks within the $d$ spacings of 4.79 to 4.85, 2.92 to 2.98, 2.48 to 2.54, 2.05 to 2.11, 1.57 to 1.63 and 1.44 to 1.49, with the most intense peak being within 2.48 to 2.54. The preferred manganese ferrites are those having the Mn predominately present as a valence of plus 2.

Ferrite formation may be acomplished by reacting an active compound of iron with an active compound of the designated metals. By active compound is meant a compound which is reactive under the conditions to form the ferrite. Starting compounds of iron or the other metal may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example manganese carbonate may be reacted with iron oxide hydrates to form manganese ferrite.

The catalysts may contain an excess of iron over the stoichiometric amount to form the ferrite. For example,

---

[2] The powder diffraction patterns may be made, e.g., with a Norelco constant potential diffraction unit type No. 12215/0, equipped with a wide range goniometer type No. 42273/0, cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1660 volts and the pulse height analyzer is set to accept pulses with amplitudes between 10 and 30 volts only. Slits used are divergence 1°, receiving .006 inches and scatter 1°. Strip chart recordings for identification are made with a scanning speed of ¼° per minute, time constant of 4 seconds and a full scale at $10^3$ counts per second. No correction is made for $K\alpha$ doublet or instrumental broadening of the band widths.

in a ferrite of the type MeFe$_2$O$_4$ the stoichiometric amount of iron would be 2 atoms per atom of Me. The iron (calculated as Fe$_2$O$_3$) may be present in an amount of at least about 10 percent in excess of the stoichiometric amount and preferably may be present in an amount of at least 14 percent in excess. Suitable ranges of iron are from about 10 to 200 percent excess. Similarly the catalysts may contain an excess of the Me over the stoichiometric amount required.

The metal ferrite catalysts prepared according to the present invention can have higher ratios of iron to metal than were possible before. This allows lower inlet temperatures and lower operating temperatures for the dehydrogenation in which the catalysts are employed.

Various methods have been employed to prepare dehydrogenation catalyst. Although the catalyst may be comprised of a single compound such as iron oxide, it has more often been the case that cocatalysts possess advantages over the single components such as a magnesium-iron oxide. Also, as pointed out above, various metal and non-metal promoters, initiators, stabilizers and the like, are often desirable. These catalysts have been prepared by precipitation, by dry or wet milling or mixing, by precipitation of one of the ingredients in the presence of the other, coprecipitation and impregnation of one or more of the solid ingredients with aqueous or non-aqueous solution(s) of salt(s) of the additional ingredients(s).

For example, one method previously used for preparing a lead molybdate/cobalt tungstate was by mixing a soluble salt of lead and a soluble molybdate salt. The lead molybdate is washed free of electrolyte and slurried with an aqueous solution of a soluble cobalt salt which is precipitated as the tungstate by mixing with a soluble tungstate salt. The resulting precipitate is washed free of electrolyte, dried and calcined. Metal ferrite oxidative dehydrogenation catalysts, for example magnesium ferrite, have been prepared by contacting magnesium oxide pellets with a solution of ferric nitrate, drying and calcining. Ferric oxide catalyst *per se* is often prepared by precipitation, i.e., a solution of a soluble salt of iron, FeCl$_3$ is precipitated by the addition of a base, NaOH to form Fe(OH)$_3$, a gelatinous precipitate which is then dehydrated.

The prior methods of dehydrogenation catalyst preparation can broadly be divided into two categories, (1) precipitation including coprecipitation, (2) physical mixing including dry and wet mixing and deposition of one ingredient from a solution onto a second ingredient. Commercial catalysts are prepared by both general methods. It has been observed, however, that catalysts prepared according to one or the other broad categories set out above exhibit more or less intrinsic weakness which is an object of the present invention to overcome.

Catalysts prepared as in category (1) above have been found to be generally weak in physical resistance. Care is necessary in handling such catalyst and usually they must be employed in beds since their rate of attrition precludes their economic use in fluidized or moving bed systems. These catalysts, however, have the advantage in multi-component catalyst systems of having very intimate contact of the components. The catalysts prepared by the method of category (2) can have the disadvantages as set out above, although usually one component or the carrier is selected for physical strength, but will have as a principal inherent disadvantage a somewhat nonhomogenous character, that is to say, in multi-component catalyst systems there will not be the same degree or type of intimate relationship achieved with the precipitation methods.

A solution to these problems was provided in commonly assigned and now abandoned U.S. application Ser. No. 11,289, filed Feb. 13, 1970, which disclosed a gel precipitation method of preparing the catalyst. That method involved having a small amount, e.g., .1 to 11 weight percent of a high (number average molecular weight of 3000 plus) molecular weight solubly polyhydric organic compound, such as a potato starch, or dextran present during the coprecipitation of the catalyst components.

SUMMARY OF THE INVENTION

The present invention is the discovery that low molecular weight polyhydric compounds provide precipitate material that are basically handled as those produced with the high molecular weight polyhydric organic compounds and in addition produce superior catalyst to those previously produced.

In the case of oxidative dehydrogenation catalysts, several other improvements are obtained by the present invention including the use of higher oxygen to hydrocarbon ratios without substantial loss of selectivity thus higher yields; lower inlet temperatures; and longer catalyst life than analogous but conventionally prepared catalysts, under similar operating conditions.

Another advantage found with the present catalysts is the increased control of the reaction. Oxidative dehydrogenation reactions are exothermic thus some means must be employed to control the temperature. Two particular means are heat exchanger for heat removal or a diluent, such as steam in the feed stream. In either case the instant catalysts provide greater control, but in the adiabatic process it has been found that the quantity of steam diluent can be reduced from that normally required thus effecting a substantial utility savings.

Briefly stated, one aspect of the present invention is an improvement in the method of preparing a catalyst for use in dehydrogenation comprising contacting a solution of soluble metal component with a precipitating agent to precipitate an insoluble metal component wherein the improvement comprises having present with the soluble metal component a soluble polyhydric organic compound having 3 to 20 carbon atoms. As used herein and in the claims the term metal component is understood to mean a single metal compound or mixture of metal compounds having the same or different anions and/or cations.

The mechanism of the polyhydric material is not fully understood. It is possible for some polyhydric compounds to form complexes with metals, however, how this improves the catalyst is not apparent. The term polyhydric is used to describe a material having at least two and preferably three or more hydroxyl groups or groups that produce hydroxyl groups under conditions of the preparation. It is also generally expected that the precipitating medium will be aqueous, however, it is contemplated that other solvents can be employed within the scope of this invention.

The lower limit of carbon atoms for the polyhydric compounds is essential, since it has been found that ethylene glycol offers no advantage in that catalyst prepared with ethylene glycol do not exhibit the superior properties of those according to the invention. The upper limit on the carbon content of the polyhydric compound relates more to practicality, availability and economic considerations. Another feature that mitigates against the higher molecular weight hydroxyl compounds is the usual reduction in the ratio of hydroxyl groups to carbon atoms with increasing carbon atoms above about 20. In the case of the polysaccharides, for example, there is a net loss of one (1) hydroxyl group for each saccharide unit added since the addition is through a —O— linkage.

It has been found in the present invention that it is desirable to have a high ratio of hydrozyl groups to carbon atoms in the polyhydric compounds, preferably a ratio of hydroxyl groups to carbon atoms of greater than 1:2, that is, more than one hydroxyl group per every two (2) carbon atoms.

The polyhydric organic compounds contemplated include polyhydric alcohols, polyethers such as the condensation products of ethylene oxide, propylene oxide and mono, di, tri and tetra saccharides.

Suitable polyhydric compounds would include, for example, diols and polydiols such as propylene glycol, dipropylene glycol, diethylene glycol, triethylene glycol, 1,3-butylene glycol, 2,2-dimethyl-1,3-propanediol and 2,2,4-trimethyl-1,3-pentanediol; triols, such as glycerol, 1,2,4-butanetriol, 2-hydroxymethyl-2-methyl-1, 3-propanediol, 2-ethyl-2-hydroxymethyl-3, 3-propane diol, 1,2,6-hexanetriol; higher polyols and polyols such as erythritol, pentaerythritol, xylitol, sorbitol, perseitol, ocitol, anhydroenneaheptitol, dipentaerythritol, tripentaerythritol; lower saccharides such as ribose, xylose, sorbose, glucose, heptulose (monosaccharides), lactose, maltose, methylglucoside (disaccharides), raffinose, melezitose (trisaccharides) and the like.

The polyhydric organic compound is typically present in the metal ion solution in the range of about .1 to 11 percent by weight based on the weight of metal in the metal component, or more usually 1 to 4 percent by weight based on the weight of metal in the metal component.

Soluble metal salts are known for essentially all metals. In specific regard to the metal components of the present invention the following soluble metal compounds are illustrative: titanium trichloride, vanadium diiodide, chromium (III) nitrate, manganese (II) titanate, iron (III) nitrate, cobalt (II) acetate, nickel nitrate, copper nitrate, niobium potassium fluoride, molybdenum dioxydichloride, ruthenium tetrachloride, rhodium dioxide, palladium chloride, stannous chloride, antimony trichloride, tungsten dioxydichloride, rhenium trichloride, osmium trichloride iridium tribromide, platinum tetrachloride, gold chloride, mercuric nitrate, thallium acetate, lead fluorosilicate, bismuth dioxide, polonium tetrachloride, magnesium selenate, aluminum bromate, calcium chlorate, scandium chloride, zinc sulfate, strontium tetrasulfide, cadmium sulfate, barium trisulfide, beryllium bromide, lanthanum heptahydrate chloride, cesium carbonate, germanium tetrafluoride, europium iodide, gallium nitrate, selenium oxide, indium trichloride and the like.

In addition to compounds of the type listed above, less soluble compounds can be employed in conjunction with other materials and techniques which will increase their solubility. For example, many insoluble compounds e.g., $Fe_2O_3$ and $MgO$, are soluble in hot concentrated acids. The addition of a cooled solution thereof to an alkaline solution will result in the precipitation of the insoluble hydroxide. Such techniques and manipulations are well known in the art and their application in the operation of the process of the present invention is contemplated.

The precipitating agent is any compound which contains an ion which when reacted with the metal ion portion or portions of the catalyst forms an insoluble compound. In a large number of cases an alkaline material such as sodium hydroxide, ammonium hydroxide, potassium hydroxide or the like will cause an insoluble hydroxide to form, e.g., $Fe(OH)_3$, $Cr(OH)_3$, $Ni(OH)_3$. A pH of between 2 and 4 is preferred for the alkali and alkaline earths metal hydroxides. Some examples of insoluble compounds prepared from soluble compounds are lead molybdate from lead nitrate and sodium molybdate, aluminum molybdate from aluminum nitrate and sodium tungstate, cobalt tungstate from cobalt nitrate and sodium tungstate, and so forth.

The catalyst preparations are generally carried out at atmospheric pressure, although either sub or super atmospheric pressures, for example, .5 to 50 atmospheres, can be employed if the conditions warrant. Temperature of the catalyst precipitation are relatively mild being at approximately room temperature (about 25° C.). Temperatures lower than room can be employed so long as the reactants are sufficiently soluble, generally temperatures no lower than 20° C. will be employed. Higher temperatures can be employed to improve the solubility of the reactants, but generally there is no need to exceed about 100° C. At higher temperatures, i.e., 30–50° C. or higher, the viscosity effect obtained from the high molecular weight polyhydric compound is decreased.

The solutions containing the metal ion and the precipitation agent can be contacted in any of the ways previously employed for precipitation known and used in the prior art. The two solutions can be mixed together with mild or vigorous agitation depending on the size of particles desired. The metal ion containing solution is conveniently sprayed into a solution of the precipitating agent in the form of droplets or a steady stream. The droplets produce spheres of catalyst and the steady stream a cylindrical type catalyst. The catalysts prepared according to this invention have been found to have excellent reactivity in oxidative dehydrogenations and superior strength. The catalysts of this invention are suitable for both fixed and moving bed operations, such as a fluidized bed.

In the preparation of the catalysts the polyhydric organic compounds is added to the solution of metal ions. Generally, if the ionic metal solution were prepared by heating, the solution is cooled prior to adding the polyhydric compound, usually to 100° C. or less, preferably 50° C. or less.

The precipitate which is obtained is a granular gelatinous material that is easily filtered. Previously the precipitates obtained were extremely difficult to process because of their tendency to clog the filtering means. The recovered filtrate is washed and dried.

The catalyst thus obtained can be used without further treatment, however, greater activity and selectivity are noted when the catalysts are activated by heating at elevated temperatures, e.g. 400–1100° C. in a controlled atmosphere, e.g., air, nitrogen, helium, a reducing atmosphere such as hydrogen, carbon monoxide and the like.

Metal ferrites may be obtained by conducting the reaction to form the ferrites at relatively low temperatures, that is, at temperatures lower than some of the very high temperatures used for the formation of ferrites prepared for semiconductor application. The very intimate relationship of the metal ferrite reactants obtained by the coprecipitation of the present invention facilitates the reaction. Generally the temperature of reaction for the formation of metal ferrites will be less than 1300° C. and preferably less than 1150° C. The reaction time at the elevated temperature in the formation of the metal ferrite catalyst may run from 5 minutes to 4 hours. Some improvement in the catalytic activity of metal ferrites may be obtained by reducing the catalyst. The reduction may be accomplished prior to the initial dehydrogenation, or after the catalyst has been used. The reduction may be accomplished with any effective reducing gas which is capable of reducing iron to a lower valence such as hydrogen, carbon monoxide, or hydrocarbons. The temperature of reduction can be from 200 to 900° C. or higher.

The preparation of catalysts is often described as an art. Experimenced researchers and chemists often have difficulty reproducing a particular catalyst. This defect is even more often encountered in commercial production of catalysts. The gel precipitation method of the present invention adds the intangible but extremely valuable asset of giving an easily handled catalyst preparation method for preparing catalysts having consistent properties.

The catalysts of this invention can be applied to the dehydrogenation of a wide variety of organic compounds. Such compounds normally will contain from 2 to 20 carbon atoms, at least one

grouping, having a boiling point below about 350° C., and may contain other elements, in addition to carbon and hydrogen such as oxygen, halogens, nitrogen and sulfur. Preferred are compounds having 2 to 12 carbon atoms, and especially preferred are compounds of 3 to 6 or 8 carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile; propionaldehyde to acrolein; ethyl chloride to vinyl chloride; methyl isobutyrate to methyl methacrylate; 2 or 3 chlorobutene-1 or 2,3-dichlorobutane to chloroprene; ethyl pyridine to vinyl pyridine; ethylbenzene to styrene; isopropylbenzene to $\alpha$-methyl styrene; ethylchlorohexane to styrene; cyclohexane to benzene; ethane to ethylene to acetylene; propane to propylene or methyl acetylene, allene, or benzene; isobutane to isobutylene; n-butane to butene and butadiene-1,3; n-butene to butadiene-1,3 and vinyl acetylene; methyl butene to isoprene; cyclopentane to cyclopentene and cyclopentadiene-1,3; n-octane to ethyl benzene and ortho-xylene; monomethylheptanes to xylenes; ethyl acetate to vinyl acetate; 2,4,4-trimethylpentane to xylenes; and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3-dichlorobutane, 1,4-dichlorobutane, the chlorofluoroethanes, methyl pentane, methylethyl ketone, diethyl ketone, n-butyl alcohol, methyl propionate, and the like.

Suitable dehydrogenation reactions are the following: acyclic compounds having 4 to 5 non-quaternary contiguous carbon atoms to the corresponding olefins, diolefins or acetylenes having the same number of carbon atoms; aliphatic hydrocarbons having 6 to 16 carbon atoms and at least one quaternary carbon atom to aromatic compounds, such as 2,4,4-trimethylpentene-1 to a mixture of xylenes; acyclic compounds having 6 to 16 carbon atoms and no quaternary carbon atoms to aromatic compounds such as n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene.

The preferred compounds to be dehydrogenated are hydrocarbons with a particularly preferred class being acyclic non-quaternary hydrocarbons having 4 to 5 contiguous carbon atoms or ethyl benzene and the preferred products are butene-1 or 2, butadiene-1,3, vinyl acetylene, 2-methyl-1-butene, 3-methyl-1-butene, 2-methyl-2-butene, isoprene, styrene or mixtures thereof. Especially preferred as feed are butene-1 or 2 and the methyl butenes and mixtures thereof such as hydrocarbon mixtures containing these compounds in at least 50 mol percent.

The dehydrogenation reaction may be carried out at atmospheric pressure, superatmospheric pressure or at subatmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The organic compound to be dehydrogenated is contacted with oxygen in order for the oxygen to oxidatively dehydrogenate the compound. Oxygen may be fed to the reactor as pure oxygen, as air, as oxygen-enriched air, oxygen mixed with diluents, and so forth. Oxygen may also be added in increments to the dehydrogenation zone. Although determinations regarding the mechanism of reaction are difficult. the process of an oxidative dehydrogenation process is one wherein the predominant mechanism is by the reaction of oxygen with the hydrogen released from the hydrocarbon.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g. air to the reactor) in the dehydrogenation zone in an amount from about 0.2 to 1.5, preferably 0.3 to 1.2, mols per mol of $H_2$ being liberated from the organic compound. Ordinarily the mols of oxygen supplied will be in the range of from .2 to 2.0 mols per mol of organic compound to be dehydrogenated. The gaseous reactants may be conducted through the reaction chamber at a fairly wide range of flow rates. The optimum flow rates will be dependent upon such variables as the temperature of reaction, pressure, particle size, and so forth. Desirable flow rates may be established by one skilled in the art. Generally the flow rate will be within the range of about 0.10 to 10 liquid volumes of the organic compound to be dehydrogenated per volume of dehydrogenation zone containing catalyst per hour (referred to as LHSV). Usually, the LHSV will be between 0.15 and about 5. For calculation, the volume of a fixed bed dehydrogenation zone containing catalyst is that original void volume of reactor space containing catalyst. Product analysis was by gas chromatography. The presence of ferrites was determined by infrared analysis.

The following examples will further illustrate the invention as described above.

EXAMPLE 1

Catalyst Preparation

This example illustrates the preparation of Mg ferrites having a weight ratio of $Fe_2O_3/MgO$ of 4/1 both according to the invention and the prior art, i.e., the processes are the same except for the polyhydric compounds. A mixture of $Fe_2Cl_3 \cdot 6H_2O$ and $MgCl_2 \cdot 6H_2O$ to give a weight ratio of 4:1 $Fe_2O_3/MgO$ in the Mg ferrite was digested in demineralized water with slight heating. The solution was cooled in an ice bath and 2 percent by weight of either pentaerythritol or dextran based on the weight of calcined catalyst composition calculated as $MgFe_2O_4$ was added. This mixture was stirred for 15 minutes and cooled in an ice bath. The cooled solution was sprayed into concentrated ammonium hydroxide (28% $NH_3$) through a 26 gauge needle which was moved in a circular motion over the ammonium hydroxide. The precipitate was aged for 20 minutes, filtered under vacuum and washed thoroughly with water until the wash water indicated pH 6. The precipitate was then dried in an oven for about 16 hours at about 120° C. under nitrogen. The dried precipitate was loaded into a 1 inch stainless steel reactor and calcined at 450° C. for 2 hours under a flow of nitrogen.

The calcined catalyst was dry ball milled for 15 hours. A supported catalyst containing 40% actives was prepared by depositing the proper amount of $MgFe_2O_4$ and 3 weight percent of 85% $H_3PO_4$ onto 3 to 5 mesh alumina (surface area $\leq 1$ m.$^2$/g.) from a slurry and dried.

EXAMPLES 2 AND 3

In these examples the two catalysts were run at approximately the same temperature conditions. The oxygen to hydrocarbon feed ratio was increased during both runs and the results given after the number of hours the process was operated under those conditions. The total number of hours on stream for each catalyst was 250. The feed was normal butenes. The catalysts were loaded into a 1 inch diameter IPS stainless steel vertical reactor in a 125 cc. bed. The catalyst was reduced by hydrogen (400 cc./min.) for 1½ hours at 750° F. The hydrogen was terminated and nitrogen introduced and the reactor cooled to reaction temperature. The nitrogen was terminated and the feed at LHSV 1.5 begun for conversion to butadiene. The conditions and results are in Table I.

TABLE I

| Ex. | Polyhydric compound | Hours on stream | $O_2$/steam/ n-butene mole ratio | Temp. of— Inlet | Max. | C/S/Y[2], mole percent |
|---|---|---|---|---|---|---|
| 2 | Dextran[1] | 100 | 0.55/20/1 | 620 | 910 | 63/94/59 |
|   |   | 100 | 0.65/20/1 | 685 | 940 | 68/93/63 |
|   |   | 50 | 0.75/20/1 | 685 | 960 | 73/91/66 |
| 3 | Pentaerythritol | 100 | 0.55/20/1 | 625 | 895 | 67/94/63 |
|   |   | 100 | 0.65/20/1 | 620 | 920 | 72/93/67 |
|   |   | 50 | 0.75/20/1 | 625 | 950 | 78/92/72 |

[1] Polysaccharide having a molecular weight of 200,000 to 300,000.
[2] Conversion/Selectivity/Yield.

At approximately the same temperature conditions, the pentaerythritol catalyst gives far better results. Actually Example 2 was run slightly cooler than Example 3.

EXAMPLES 4 AND 5

This set of runs was carried out in the same manner as Examples 2 and 3 but equal yields were sought from the catalysts. The point to be made in these Examples is that the dextran catalyst (Example 4) required considerably higher temperatures to come up to the yields of the pentaerythritol catalyst (Example 5). The results are set out in Table II.

TABLE II

| Ex. | Polyhydric compound | Hours on stream | $O_2$/steam/ n-butene mole ratio | Temp. of— Inlet | Max. | C/S/Y, mole percent |
|---|---|---|---|---|---|---|
| 4 | Dextran | 100 | 0.55/20/1 | 700 | 970 | 66/93/61 |
|   |   | 100 | 0.65/20/1 | 700 | 990 | 73/93/68 |
|   |   | 100 | 0.75/20/1 | 720 | 1000 | 76/92/70 |
| 5 | Pentaerythritol | 100 | 0.55/20/1 | 625 | 880 | 64/94/60 |
|   |   | 100 | 0.65/20/1 | 625 | 905 | 71/94/67 |
|   |   | 100 | 0.75/20/1 | 625 | 945 | 80/92/74 |

EXAMPLES 6 AND 7

Two additional catalysts were prepared according to the procedure of Example 1 but with glycerol and ethylene glycol as the polyhydric compound, respectively. 40 percent of the $MgFe_2O_4$ was deposited on the alumina support. The conditions and results are set out in Table III. The ethylene glycol provided no improvement in the catalyst.

TABLE III

| Ex. | Polyhydric compound | Hours on stream | $O_2$/steam/ n-butene mole ratio | Temp. °F.— Inlet | Max. | C/S/Y |
|---|---|---|---|---|---|---|
| 6 | Glycerol | 220 | .55/20/1 | 630 | 920 | 64.0/94.0/60.2 |
|   |   | 170 | .65/20/1 | 635 | 950 | 74.0/93.0/68.8 |
|   |   | 300 | .75/20/1 | 635 | 960 | 78.0/92.5/72.2 |
| 7 | Ethylene glycol | 200 | .55/20/1 | 630 | 890 | 62.5/93.0/59.1 |
|   |   | 60 | .65/20/1 | 650 | 950 | 66.0/92.0/60.7 |

The invention claimed is:

1. The method of preparing ferrite catalyst comprising contacting a solution of soluble metal component wherein the soluble metal component consists essentially of iron and at least one other metal selected from the group consisting of Mg, Ca, Sr, Ba, Mn, Cr, Co, Ni, Zn, Cd and mixtures thereof to precipitate an insoluble metal component provided that the insoluble metal component is an oxide, mixture of oxides, or compounds that are precursors of oxides under the conditions to form the catalyst wherein there is present during precipitation from 0.1 to 11 weight percent, based on the weight of metal, of a polyhydric alcohol compound having from 3 to 20 carbon atoms and being selected from the group consisting of polyhydric alcohols and polyethers wherein the ratio of hydroxyl groups to carbon is greater than 1:2, and calcining said insoluble metal component to form a ferrite.

2. The process according to claim 1 wherein the other metal is Mg or Mn.

3. The process according to claim 1 wherein said other metal is Mg.

4. The process according to claim 3 wherein said polyhydric compound is pentaerythritol.

5. In the method of preparing a ferrite catalyst comprising contacting a solution of soluble metal component wherein the soluble metal component consists essentially of iron and at least one other metal selected from the group consisting of Mg, Ca, Sr, Ba, Mn, Cr, Co, Ni, Zn, Cd and mixtures thereof with a precipitating agent to precipitate an insoluble metal component provided that the insoluble metal component is an oxide, mixture of oxides, or compounds that are precursors of oxides under the conditions to form the catalyst and calcining said insoluble metal component to form a ferrite wherein the improvement comprises having present with the soluble metal component from 0.1 to 11 weight percent of a soluble polyhydric compound, based on the weight of metal, selected from the group consisting of propylene glycol, dipropylene glycol, diethylene glycol, triethylene glycol, 1,3-butylene glycol, 2,2-dimethyl-1,3-propanediol, 2,2,4-triethyl-1,3-pentanediol, glycerol, 1,2,4-butanetriol, 2-hydroxymethyl-2-methyl-1,3-propanediol, 2-ethyl-2-hydroxymethyl-3,3-propanediol, 1,2,6-hexanetriol, ethritol, pentaerythritol, xylitol, sorbitol, perseitol, octitol, anhydroenneaheptitol, dipentaerythritol, tripentaerythritol, ribose, xylose, sorbose, glucose, heptulose, lactose, maltose, methylglucoside, raffinose and and melezitose.

6. The method according to claim 5 wherein the ratio of hydroxyl groups to carbon atoms in the polyhydric compound is greater than 1:2.

7. The method according to claim 5 wherein there is .1 to 4 weight percent of polyhydric compound.

8. The method according to claim 5 wherein the other metal is Mg or Mn.

9. The method according to claim 5 wherein the polyhydric compound is glycerol.

10. The method according to claim 5 wherein the polyhydric compound is pentaerythritol.

11. The method according to claim 5 wherein the solution of soluble metal component is sprayed into the precipitating agent.

References Cited

UNITED STATES PATENTS

| 2,110,879 | 3/1938 | Joshua et al. | 252—428 |
| 2,204,157 | 6/1940 | Semon | 252—428 |
| 2,930,766 | 3/1960 | Lacey | 252—447 |
| 3,380,932 | 4/1968 | Alexander et al. | 260—680 |
| 3,425,666 | 2/1969 | Lindquist et al. | 423—594 |
| 3,438,723 | 4/1969 | Pechini | 423—594 |

FOREIGN PATENTS 708,957   5/1954   Great Britain.

PAUL M. COUGHLAN, Jr., Primary Examiner

U.S. Cl. X.R.

252—437, 473; 260—680 E; 423—263

UNITED STATES PATENT OFFICE
CERTIFICATE OF CORRECTION

Patent No. 3,828,101     Dated August 6, 1974

Inventor(s) Edward J. Miklas

It is certified that error appears in the above-identified patent and that said Letters Patent are hereby corrected as shown below:

In the grant (only), insert columns 5 - 8, as part of the Letters Patent.

Signed and sealed this 12th day of November 1974.

(SEAL)
Attest:

McCOY M. GIBSON JR.
Attesting Officer

C. MARSHALL DANN
Commissioner of Patents in a ferrite of the type $MeFe_2O_4$ the stoichiometric amount of iron would be 2 atoms per atom of Me. The iron (calculated as $Fe_2O_3$) may be present in an amount of at least about 10 percent in excess of the stoichiometric amount and preferably may be present in an amount of at least 14 percent in excess. Suitable ranges of iron are from about 10 to 200 percent excess. Similarly the catalysts may contain an excess of the Me over the stoichiometric amount required.

The metal ferrite catalysts prepared according to the present invention can have higher ratios of iron to metal than were possible before. This allows lower inlet temperatures and lower operating temperatures for the dehydrogenation in which the catalysts are employed.

Various methods have been employed to prepare dehydrogenation catalyst. Although the catalyst may be comprised of a single compound such as iron oxide, it has more often been the case that cocatalysts possess advantages over the single components such as a magnesium-iron oxide. Also, as pointed out above, various metal and non-metal promoters, initiators, stabilizers and the like, are often desirable. These catalysts have been prepared by precipitation, by dry or wet milling or mixing, by precipitation of one of the ingredients in the presence of the other, coprecipitation and impregnation of one or more of the solid ingredients with aqueous or nonaqueous solution(s) of salt(s) of the additional ingredients(s).

For example, one method previously used for preparing a lead molybdate/cobalt tungstate was by mixing a soluble salt of lead and a soluble molybdate salt. The lead molybdate is washed free of electrolyte and slurried with an aqueous solution of a soluble cobalt salt which is precipitated as the tungstate by mixing with a soluble tungstate salt. The resulting precipitate is washed free of electrolyte, dried and calcined. Metal ferrite oxidative dehydrogenation catalysts, for example magnesium ferrite, have been prepared by contacting magnesium oxide pellets with a solution of ferric nitrate, drying and calcining. Ferric oxide catalyst *per se* is often prepared by precipitation, i.e., a solution of a soluble salt of iron, $FeCl_3$ is precipitated by the addition of a base, NaOH to form $Fe(OH)_3$, a gelatinous precipitate which is then dehydrated.

The prior methods of dehydrogenation catalyst preparation can broadly be divided into two categories, (1) precipitation including coprecipitation, (2) physical mixing including dry and wet mixing and deposition of one ingredient from a solution onto a second ingredient. Commercial catalysts are prepared by both general methods. It has been observed, however, that catalysts prepared according to one or the other broad categories set out above exhibit more or less intrinsic weakness which is an object of the present invention to overcome.

Catalysts prepared as in category (1) above have been found to be generally weak in physical resistance. Care is necessary in handling such catalyst and usually they must be employed in beds since their rate of attrition precludes their economic use in fluidized or moving bed systems. These catalysts, however, have the advantage in multi-component catalyst systems of having very intimate contact of the components. The catalysts prepared by the method of category (2) can have the disadvantages as set out above, although usually one component or the carrier is selected for physical strength, but will have as a principal inherent disadvantage a somewhat nonhomogenous character, that is to say, in multi-component catalyst systems there will not be the same degree or type of intimate relationship achieved with the precipitation methods.

A solution to these problems was provided in commonly assigned and now abandoned U.S. application Ser. No. 11,289, filed Feb. 13, 1970, which disclosed a gel precipitation method of preparing the catalyst. That method involved having a small amount, e.g., .1 to 11 weight percent of a high (number average molecular weight of 3000 plus) molecular weight soluble polyhydric organic compound, such as a potato starch, or dextran present during the coprecipitation of the catalyst components.

SUMMARY OF THE INVENTION

The present invention is the discovery that low molecular weight polyhydric compounds provide precipitate material that are basically handled as those produced with the high molecular weight polyhydric organic compounds and in addition produce superior catalyst to those previously produced.

In the case of oxidative dehydrogenation catalysts, several other improvements are obtained by the present invention including the use of higher oxygen to hydrocarbon ratios without substantial loss of selectivity thus higher yields; lower inlet temperatures; and longer catalyst life than analogous but conventionally prepared catalysts, under similar operating conditions.

Another advantage found with the present catalysts is the increased control of the reaction. Oxidative dehydrogenation reactions are exothermic thus some means must be employed to control the temperature. Two particular means are heat exchanger for heat removal or a diluent, such as steam in the feed stream. In either case the instant catalysts provide greater control, but in the adiabatic process it has been found that the quantity of steam diluent can be reduced from that normally required thus effecting a substantial utility savings.

Briefly stated, one aspect of the present invention is an improvement in the method of preparing a catalyst for use in dehydrogenation comprising contacting a solution of soluble metal component with a precipitating agent to precipitate an insoluble metal component wherein the improvement comprises having present with the soluble metal component a soluble polyhydric organic compound having 3 to 20 carbon atoms. As used herein and in the claims the term metal component is understood to mean a single metal compound or mixture of metal compounds having the same or different anions and/or cations.

The mechanism of the polyhydric material is not fully understood. It is possible for some polyhydric compounds to form complexes with metals, however, how this improves the catalyst is not apparent. The term polyhydric is used to describe a material having at least two and preferably three or more hydroxyl groups or groups that produce hydroxyl groups under conditions of the preparation. It is also generally expected that the precipitating medium will be aqueous, however, it is contemplated that other solvents can be employed within the scope of this invention.

The lower limit of carbon atoms for the polyhydric compounds is essential, since it has been found that ethylene glycol offers no advantage in that catalyst prepared with ethylene glycol do not exhibit the superior properties of those according to the invention. The upper limit on the carbon content of the polyhydric compound relates more to practicality, availability and economic considerations. Another feature that mitigates against the higher molecular weight hydroxyl compounds is the usual reduction in the ratio of hydroxyl groups to carbon atoms with increasing carbon atoms above about 20. In the case of the polysaccharides, for example, there is a net loss of one (1) hydroxyl group for each saccharide unit added since the addition is through a —O— linkage.

It has been found in the present invention that it is desirable to have a high ratio of hydrozyl groups to carbon atoms in the polyhydric compounds, preferably a ratio of hydroxyl groups to carbon atoms of greater than 1:2, that is, more than one hydroxyl group per every two (2) carbon atoms.

The polyhydric organic compounds contemplated include polyhydric alcohols, polyethers such as the condensation products of ethylene oxide, propylene oxide and mono, di, tri and tetra saccharides.

Suitable polyhydric compounds would include, for example, diols and polydiols such as propylene glycol, dipropylene glycol, diethylene glycol, triethylene glycol, 1,3-butylene glycol, 2,2-dimethyl-1,3-propanediol and 2,2,4-trimethyl-1,3-pentanediol; triols, such as glycerol, 1,2,4-butanetriol, 2-hydroxymethyl-2-methyl-1, 3-propanediol, 2-ethyl-2-hydroxymethyl-3, 3-propane diol, 1,2,6-hexanetriol; higher polyols and polyols such as erythritol, pentaerythritol, xylitol, sorbitol, perseitol, ocitol, anhydroenneaheptitol, dipentaerythritol, tripentaerythritol; lower saccharides such as ribose, xylose, sorbose, glucose, heptulose (monosaccharides), lactose, maltose, methylglucoside (disaccharides), raffinose, melezitose (trisaccharides) and the like.

The polyhydric organic compound is typically present in the metal ion solution in the range of about .1 to 11 percent by weight based on the weight of metal in the metal component, or more usually 1 to 4 percent by weight based on the weight of metal in the metal component.

Soluble metal salts are known for essentially all metals. In specific regard to the metal components of the present invention the following soluble metal compounds are illustrative: titanium trichloride, vanadium diiodide, chromium (III) nitrate, manganese (II) titanate, iron (III) nitrate, cobalt (II) acetate, nickel nitrate, copper nitrate, niobium potassium fluoride, molybdenum dioxydichloride, ruthenium tetrachloride, rhodium dioxide, palladium chloride, stannous chloride, antimony trichloride, tungsten dioxydichloride, rhenium trichloride, osmium trichloride iridium tribromide, platinum tetrachloride, gold chloride, mercuric nitrate, thallium acetate, lead fluorosilicate, bismuth dioxide, polonium tetrachloride, magnesium selenate, aluminum bromate, calcium chlorate, scandium chloride, zinc sulfate, strontium tetrasulfide, cadmium sulfate, barium trisulfide, beryllium bromide, lanthanum heptahydrate chloride, cesium carbonate, germanium tetrafluoride, europium iodide, gallium nitrate, selenium oxide, indium trichloride and the like.

In addition to compounds of the type listed above, less soluble compounds can be employed in conjunction with other materials and techniques which will increase their solubility. For example, many insoluble compounds e.g., $Fe_2O_3$ and $MgO$, are soluble in hot concentrated acids. The addition of a cooled solution thereof to an alkaline solution will result in the precipitation of the insoluble hydroxide. Such techniques and manipulations are well known in the art and their application in the operation of the process of the present invention is contemplated.

The precipitating agent is any compound which contains an ion which when reacted with the metal ion portion or portions of the catalyst forms an insoluble compound. In a large number of cases an alkaline material such as sodium hydroxide, ammonium hydroxide, potassium hydroxide or the like will cause an insoluble hydroxide to form, e.g., $Fe(OH)_3$, $Cr(OH)_3$, $Ni(OH)_3$. A pH of between 2 and 4 is preferred for the alkali and alkaline earths metal hydroxides. Some examples of insoluble compounds prepared from soluble compounds are lead molybdate from lead nitrate and sodium molybdate, aluminum molybdate from aluminum nitrate and sodium tungstate, cobalt tungstate from cobalt nitrate and sodium tungstate, and so forth.

The catalyst preparations are generally carried out at atmospheric pressure, although either sub or super atmospheric pressures, for example, .5 to 50 atmospheres, can be employed if the conditions warrant. Temperature of the catalyst precipitation are relatively mild being at approximately room temperature (about 25° C.). Temperatures lower than room can be employed so long as the reactants are sufficiently soluble, generally temperatures no lower than 20° C. will be employed. Higher temperatures can be employed to improve the solubility of the reactants, but generally there is no need to exceed about 100° C. At higher temperatures, i.e., 30–50° C. or higher, the viscosity effect obtained from the high molecular weight polyhydric compound is decreased.

The solutions containing the metal ion and the precipitation agent can be contacted in any of the ways previously employed for precipitation known and used in the prior art. The two solutions can be mixed together with mild or vigorous agitation depending on the size of particles desired. The metal ion containing solution is conveniently sprayed into a solution of the precipitating agent in the form of droplets or a steady stream. The droplets produce spheres of catalyst and the steady stream a cylindrical type catalyst. The catalysts prepared according to this invention have been found to have excellent reactivity in oxidative dehydrogenations and superior strength. The catalysts of this invention are suitable for both fixed and moving bed operations, such as a fluidized bed.

In the preparation of the catalysts the polyhydric organic compounds is added to the solution of metal ions. Generally, if the ionic metal solution were prepared by heating, the solution is cooled prior to adding the polyhydric compound, usually to 100° C. or less, preferably 50° C. or less.

The precipitate which is obtained is a granular gelatinous material that is easily filtered. Previously the precipitates obtained were extremely difficult to process because of their tendency to clog the filtering means. The recovered filtrate is washed and dried.

The catalyst thus obtained can be used without further treatment, however, greater activity and selectivity are noted when the catalysts are activated by heating at elevated temperatures, e.g. 400–1100° C. in a controlled atmosphere, e.g., air, nitrogen, helium, a reducing atmosphere such as hydrogen, carbon monoxide and the like.

Metal ferrites may be obtained by conducting the reaction to form the ferrites at relatively low temperatures, that is, at temperatures lower than some of the very high temperatures used for the formation of ferrites prepared for semiconductor application. The very intimate relationship of the metal ferrite reactants obtained by the coprecipitation of the present invention facilitates the reaction. Generally the temperature of reaction for the formation of metal ferrites will be less than 1300° C. and preferably less than 1150° C. The reaction time at the elevated temperature in the formation of the metal ferrite catalyst may run from 5 minutes to 4 hours. Some improvement in the catalytic activity of metal ferrites may be obtained by reducing the catalyst. The reduction may be accomplished prior to the initial dehydrogenation, or after the catalyst has been used. The reduction may be accomplished with any effective reducing gas which is capable of reducing iron to a lower valence such as hydrogen, carbon monoxide, or hydrocarbons. The temperature of reduction can be from 200 to 900° C. or higher.

The preparation of catalysts is often described as an art. Experimenced researchers and chemists often have difficulty reproducing a particular catalyst. This defect is even more often encountered in commercial production of catalysts. The gel precipitation method of the present invention adds the intangible but extremely valuable asset of giving an easily handled catalyst preparation method for preparing catalysts having consistent properties.

The catalysts of this invention can be applied to the dehydrogenation of a wide variety of organic compounds. Such compounds normally will contain from 2 to 20 carbon atoms, at least one

grouping, having a boiling point below about 350° C., and may contain other elements, in addition to carbon and hydrogen such as oxygen, halogens, nitrogen and sulfur. Preferred are compounds having 2 to 12 carbon atoms, and especially preferred are compounds of 3 to 6 or 8 carbon atoms.

PO-1050
(5/69)

UNITED STATES PATENT OFFICE
CERTIFICATE OF CORRECTION

Patent No. 3,828,101          Dated August 6, 1974

Inventor(s)    Edward J. Miklas

It is certified that error appears in the above-identified patent and that said Letters Patent are hereby corrected as shown below:

Col. 3, line 26 reads "and earth ferrites" but should read --- and rare earth ferrites ---.

Col. 3, line 64 reads "Group" but should read --- Groups ---.

Col. 4, line 19 reads "Producers" but should read --- Procedures ---.

Col. 5, line 28 reads "ingredients(s)" but should read --- ingredient(s) --

Col. 6, line 67 reads "hydrozyl" but should read --- hydroxyl ---.

Col. 8, line 56 reads "Experimenced" but should read -- Experienced ---.

Col. 10, line 4 reads "difficult. the" but should read --- difficult, the ---.

Col. 11, line 21 (first occurrence) reads "Example 2" but should read --- Example 3 ---.

Col. 11, line 21 (second occurrence) reads "Example 3" but should read --- Example 2 ---.

Signed and sealed this 22nd day of April 1975.

(SEAL)
Attest:

RUTH C. MASON
Attesting Officer

C. MARSHALL DANN
Commissioner of Patents
and Trademarks